United States Patent

Schubert

[19]

[11] Patent Number: 6,122,895

[45] Date of Patent: *Sep. 26, 2000

[54] PROCESS AND APPARATUS FOR INTRODUCING PRODUCTS INTO CONTAINERS

[75] Inventor: Ralf Schubert, Crailsheim, Germany

[73] Assignee: Gerhard Schubert GmbH, Crailsheim, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/001,031

[22] Filed: Dec. 30, 1997

[30] Foreign Application Priority Data

Jan. 30, 1997 [DE] Germany .................. 297 01 564 U

[51] Int. Cl.$^7$ .............. B65B 5/12; B65B 57/20
[52] U.S. Cl. .............. 53/55; 53/240; 53/251; 53/475; 53/501; 53/246
[58] Field of Search .............. 53/475, 473, 55, 53/501, 500, 52, 251, 250, 249, 252, 253, 240, 237, 244, 246

[56] References Cited

U.S. PATENT DOCUMENTS

| | | | |
|---|---|---|---|
| 2,941,341 | 4/1960 | Clinton | 53/240 X |
| 3,191,358 | 6/1965 | Scherr et al. | 53/240 |
| 3,456,424 | 7/1969 | Thurston et al. | 53/240 X |
| 4,630,428 | 12/1986 | Lesch | 53/251 X |
| 4,677,808 | 7/1987 | Chenevard | 53/240 X |
| 4,881,356 | 11/1989 | Beezer et al. | 53/240 X |
| 5,339,607 | 8/1994 | Regier | 53/501 |

FOREIGN PATENT DOCUMENTS

| | | |
|---|---|---|
| 0162933A1 | 12/1985 | European Pat. Off. . |
| 0749902A1 | 12/1996 | European Pat. Off. . |
| 2612487 | 9/1988 | France . |
| 1066478 | 1/1960 | Germany . |
| 4208818A1 | 9/1993 | Germany . |

*Primary Examiner*—James F. Coan
*Attorney, Agent, or Firm*—Birch, Stewart, Kolasch & Birch, LLP

[57] ABSTRACT

In a process and an apparatus for introducing individual products into containers for receiving a given number of individual products for filling the containers, by means of a picker line, the individual products and the containers are not advanced with a transportation movement in co-flow relationship, and delivery of the next container to be filled, into the working region of the pickers of the picker line, is controlled in dependence thereon.

25 Claims, 2 Drawing Sheets

6,122,895

PROCESS AND APPARATUS FOR INTRODUCING PRODUCTS INTO CONTAINERS

FIELD OF THE INVENTION

The invention concerns a process and apparatus for introducing individual products into containers for receiving same.

In the present context the individual products are usually delivered on a product conveyor belt and the containers are delivered on a container conveyor belt and are passed along picker devices which are disposed at fixed positions, and for that reason reference will only be made hereinafter to that design configuration, without however limiting the invention thereto as in principle the individual products and/or the containers could also be stationary and the picker units could be movable in relation thereto.

BACKGROUND OF THE INVENTION

In the case of a picker line as is used for the transposition of individual products into containers which can accommodate a given number of individual products, the procedure involved hitherto was such that the containers were delivered on a first container conveyor belt and generally accumulated thereon, transferred from the first container conveyor belt onto a second container conveyor belt on which the respective containers were filled with the appropriate number of individual products, and then, after complete filling of each container, the containers were in turn transposed onto a third container conveyor belt for the filled containers to be transported away.

Reference may be made in this respect to DE 42 08 818 C2 which provides for the use of a picker line in which the pickers are not disposed at fixed positions in relation to the product conveyor belt and the container conveyor belt, but are limitedly movable in the direction of travel thereof. In that case however either the product conveyor belt which supplies the individual products is temporarily stopped, which causes difficulties in terms of coupling to a continuously operating machine for producing individual products, or the container conveyor belt is stopped when the container which is not yet completely filled threatens to leave the working region of the picker or pickers.

SUMMARY OF THE INVENTION

An object of the present invention is to provide a process for introducing products into containers for receiving a number thereof for filling each container, in which the expenditure for handling the containers to be filled is reduced without adversely affecting the efficiency of the installation.

Another object of the invention is to provide a process for introducing individual products into containers by means of a picker line which affords a more rational and versatile mode of operation.

Yet another object of the invention is to provide a process for introducing individual products into containers for receiving a given number of products for filling same by means of a picker line which permits smooth operation with enhanced versatility by virtue of improved interrelationship of the operating steps involved.

Still a further object of the invention is to provide an apparatus for introducing individual products into containers for receiving a given number thereof for filling same, which is of an uncomplicated design configuration while nonetheless providing for improved versatility and functionality of operation.

In accordance with the principles of the present invention the foregoing and other objects are attained by a process for introducing individual products into containers for receiving a given number of products for filling same, by means of a picker line, wherein the individual products and the containers are not advanced with a transportation movement in co-flow relationship and, in dependence thereon, delivery of the next container to be filled into the working region of the pickers of the picker line is controlled.

In terms of the apparatus the foregoing and other objects are attained in accordance with the invention by an apparatus comprising a first storage surface for the individual products, and a second storage surface for the containers. The apparatus has a picker line including at least one picker for transposing individual products from the first storage surface into containers, and control and drive means for moving the first storage surface, the second storage surface and the picker support means relative to each other. The apparatus further includes control and drive means for movement of the picker arm of the at least one picker for transposing the individual products into the containers. The first storage surface for the individual products and the second storage surface for the containers are not moved in co-flow relationship with each other while the control and drive means is so operable that the speed of the first storage surface and the speed of the second storage surface are so controlled relative to each other that on leaving the working region of the last picker in the direction of transportation movement of the second storage surface the containers are entirely filled with individual products.

As will be seen from the description set forth hereinafter of a preferred embodiment of the invention, the arrangement of a counter for the individual products on the product conveyor belt, upstream of the beginning of the picker region, makes it possible to release an empty container and allow it to pass into the region of the picker or pickers, whenever the number of individual products is detected as having reached the number required to fill a container. By virtue of that arrangement, only a single container conveyor belt is required, with a stopper device for causing an accumulation of the empty containers, the stopper device being controlled by the counter.

Preferably, the container conveyor belt is driven at the same speed as the product conveyor belt, preferably at a constant speed.

The design configuration of the apparatus can the particularly simple if the product conveyor belt and the container conveyor belt are driven from a common drive or are brought together to form an integral transport belt, for example being separated in the longitudinal direction by an upright wall or partition, into a transport region for the individual products and a transport region for the containers.

Depending on the respective position of the counter in the direction of transportation movement, relative to the picker region and relative to the arrangement of the stopper device on the conveyor container belt which generally moves parallel to the product conveyor belt, the process and apparatus involve a displacement in respect of time for release of the next empty container in order to transport the container to be filled in substantially parallel relationship beside the products intended for that container, on the product conveyor belt.

In that situation, filling of a container can be completely effected with only one picker or by way of a plurality of pickers arranged in the direction of transportation movement along the belt, depending on the speed of travel and the density of the individual products per unit of length of the product conveyor belt.

In a preferred feature of the invention the counter may be a camera which scans in a line-vise manner, preferably with a CCD-sensor, the scanning line of which extends transversely over the product conveyor belt, preferably at a right angle.

The picker or pickers can be connected on the one hand to a computer and on the other hand to an image-recording unit, for example a CCD-camera, in this case once again with a line-scanning camera whose recording region extends transversely over the product conveyor belt.

By means of that line camera for control of the picker or pickers, during the movement of the product conveyor belt past a defined location, namely the line scanned by the camera, upstream of the picker region, the position of each individual product on the product conveyor belt and the location thereof is ascertained and subjected to further processing in the computer, having regard to the speed of transportation movement of the products and the spacing between the scanned line and the picker position, in order to control the picker accurately for gripping the individual products and transposing them into the respective container, including the necessary rotary movement of the product.

In the present case, preferably the first camera for counting the individual products arriving on the product conveyor belt, for controlling the container supply on the one hand, and the second camera for controlling the at least one picker on the other hand, can be combined in a single camera insofar as it is arranged sufficiently far upstream of the beginning of the picker region to permit the next container on the container conveyor belt to be liberated in good time.

In a preferred feature, besides the counter for the products and the stopper device for the empty containers supplied, all pickers of a product conveyor belt are also connected by way of a data bus to the control computer so that, from the positions and orientations of the individual products on the product conveyor belt, which were originally recorded by the camera for picker control purposes, the assembly respectively extrapolates which individual product has already been transposed by the picker.

By virtue thereof, prior to the beginning of each new working region of the next picker, for control of that picker, the originally occupied product positions at which a product is still present on the product belt are known. As a result, idle or non-productive movements of the picker or pickers are avoided as well as idle or non-productive filling operations on a respective container, which would result in incomplete filling of containers and subsequent mechanical processing to make up for such deficiencies, or even rejection of defective containers.

If, in the case of the above-described mode of operation, different individual products are supplied in a randomly mingled arrangement on the product conveyor belt, which products are distinguished by means of the counter and by means of the camera for picker control and are introduced into defined associated positions in respect of the containers, release of the next empty container occurs only when the minimum number required for each container of each given kind of different products which are to be accommodated in the container has passed the counter.

The result of this however is that—in contrast to the transposition of only one kind of product on a product conveyor belt—after the step of filling the respective containers the product conveyor belt is not completely empty as release of the containers must be dependent on the kind of product which is supplied in the comparatively rarest numbers.

By means of the above-indicated process according to the invention, it is also possible, with for example only one product conveyor belt, to operate with two different container conveyor belts on each of the two sides and in parallel relationship with the product conveyor belt, the container conveyor belts being formed separately or integrally with the product conveyor belt. This is meaningful not only when using product conveyor belts which transport a high number of individual products per unit of length and which are therefore of a correspondingly great width and densely loaded, but also for reasons of most efficient use of the picker or pickers.

If the entire installation is overall interconnected for control purposes by way of a common control computer or a data bus, it is possible to use one and the same picker not only for filling the one conveyor belt but for filling alternately one conveyor belt or the other.

It is precisely when dealing with different individual products disposed on the product conveyor belt, that it is also possible to envisage that one of the two container conveyor belts can move at the maximum possible speed, whereas the other container conveyor belt moves at a speed which is significantly reduced in comparison therewith, so that the containers on the second container conveyor belt serve so-to-speak as a buffer means for the different individual products which are supplied in a differently distributed configuration on the product conveyor belt. That affords an optimum degree of emptying of the product conveyor belt.

As noted above, a simplification which is again desirable in terms of structural complication and expenditure and in regard to control can be achieved if the container conveyor belt and the product conveyor belt are not moved in parallel relationship but in counter-flow relationship or, in broad terms, at least not in co-flow relationship. Theoretically it is also possible to adopt mutually crossing variations of the product conveyor belt and the container conveyor belt, although parallel movement in opposite directions is considered to represent the most efficient form of arrangement.

By virtue of the containers and the individual products being advanced in counter-flow relationship, it is possible to forego the step of initially counting the individual products and the step of releasing the containers depending on the respective number of individual products counted.

The speed of containers on the one hand and individual products on the other hand relative to each other is only so controlled that no container leaves the working region of the transposition assembly, that is to say the picker or pickers, without being at least substantially completely filled. In addition the aim is that, in the opposite direction, there are no longer any individual products remaining on the product conveyor belt as soon as the product conveyor belt leaves the transposition region, that is to say the working region of the individual picker or the plurality of pickers which operate in succession on the same containers.

Whether one of the speeds, that is to say for example the speed of the product conveyor belt, is predetermined, and then only the respective other belt is controlled in terms of its instantaneous speed, or whether both belts are so controlled that the maximum working speed of the pickers operating thereat can be fully utilised, depends on the previous working steps which have to be executed on the product conveyor belt and on the container conveyor belt respectively. Whether those two aims, namely on the one hand complete filling of all containers leaving the transposition region where the pickers operate and on the other hand at the same time complete emptying of the product conveyor belt so that no products remain thereon can be achieved at the same time, depends inter alia on whether only a single kind of product is disposed on the product conveyor belt and has to be transposed into the containers, or whether a plurality of kinds of product are supplied in a randomly arranged array on the product conveyor belt. In that case, it is scarcely possible to achieve both those aims at the same time, unless the composition of the products on the product conveyor belt can be controlled in terms of quantity in accordance with the individual kinds of products involved, or there is no need for a given composition in terms of products, within the containers filled thereby.

There are many different advantages involved in a counter-flow mode of operation of that kind: the costs involved in setting up the installation are reduced and the susceptibility to trouble or breakdown is also reduced as this counter-flow mode of operation means above all that the number of photoelectric cells required is reduced to about one tenth of the requirement when using an installation which operates on a co-flow basis, because for example the installation no longer needs to include locations at which containers and the like have to be accumulated, and therefore there is now no longer any need for photoelectric cells at those non-existent locations.

The expenditure in terms of control procedure is also drastically reduced as there is no need to count the arriving individual products, before they reach the transposition region.

The relationship between the speeds of the containers on the one hand and the individual products on the other hand is regulated as required during operation of the assembly so that only completely filled containers leave the transposition region where products are transposed from the product conveyor belt into containers on the container conveyor belt. As a result, depending on the transposition travel involved between the product conveyor belt and the container conveyor belt and thus depending on the amount of time required for operation of the pickers, and like factors, it is also possible to arrive at improved optimisation of the transposition operation if one of the belts, for example the product conveyor belt, has to be operated at a predetermined constant speed. That is not possible in the case of an apparatus which operates with a co-flow relationship between the products and the containers.

A further advantage is that the container conveyor belts used can also be in the form of transport chains, that is to say more specifically transport means in which the containers are arranged at fixed spacings on the transport means.

Further functional advantages provide that, as considered in the direction of travel of the containers, there is always a free location, a so-called |nest| available in the container, at the beginning of the transposition region of the apparatus, while towards the end of the transposition region, particularly if different products are supplied in a randomly disposed array on the product conveyor belt, there is the greatest probability that an individual product which is required at that time is then disposed in the working region of that picker which is the last picker in the direction of movement of the containers through the apparatus. There is thus an extremely low degree of probability that a container which has not been completely filled with products leaves the transposition region, or a reduction in the speed of movement of the container conveyor belt or even complete stoppage thereof, which is required to remedy that deficiency, can be reduced to a minimum.

When the containers are arranged at fixed spacings on the container conveyor belt, as indicated above, in the ideal case no photoelectric cell whatsoever is required for monitoring of the containers and for monitoring whether given nests in the containers are free, as, based on the fixed empty positions at the beginning of the transposition region, by virtue of the installation control system, it is known at what position, both relatively within a container and also absolutely along the container conveyor belt, there is a free nest, and for which kind of individual product.

The counter-flow mode of operation is thus particularly suitable for use together with two-arm robots as the pickers.

Further objects, advantages and features of the process and apparatus according to the present invention will be apparent from the following description of a preferred embodiment thereof.

DESCRIPTION OF THE PREFERRED EMBODIMENTS

Figure 1:
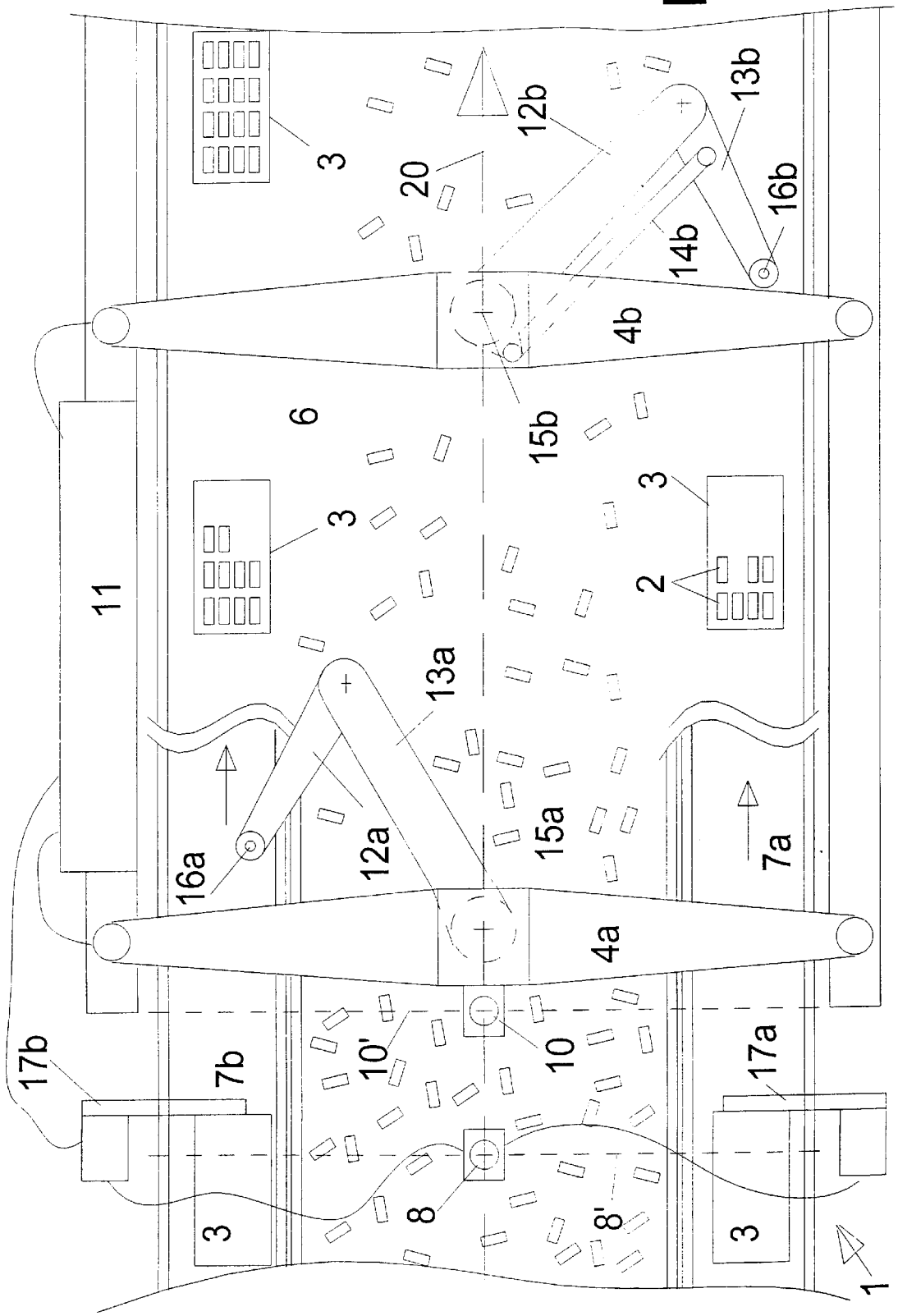
FIG. 1 is a plan view of a picker line operating in the co-flow mode of operation.

Referring firstly to FIG. 1, shown therein is a picker line generally identified by reference numeral 1 which, in the direction of travel as indicated at 20, that is to say from left to right in FIG. 1, conveys individual products 2 which pass through below pickers 4a, 4b, with the products 2 being randomly arranged on a storage surface in the form of a product conveyor belt 6.

As shown in the left-hand half in FIG. 1 empty containers 3 move parallel to the product conveyor belt 6 on a second storage surface in the form of container conveyor belts 7a, 7b.

Upstream of the beginning of the first picker 4a, a line extending transversely over the product belt 6 and preferably at a right angle thereto is scanned by means of a first line camera diagrammatically indicated at 8. The line is indicated at 8'. The camera 8 like each of the pickers 4a, 4b is connected to a central control 11 which includes a computer.

The empty containers 3 are transported to the pickers on the container conveyor belts 7a and 7b and accumulated there by means of a stopper device 17a, 17b which extends transversely over the respective container conveyor belt 7a, 7b and against which the leading empty container 3 bears. The stopper devices 17a and 17b are also connected to the control 11.

The first stopped empty container 3 is released as soon as a number of individual products 2 on the product conveyor belt 6 as corresponds to the number of products for filling a respective container 3 has passed through below the first camera 8.

So that the next container 3 to be filled with those individual products 2, after release, moves approximately parallel to the products 2 which are intended for it, preferably the first camera 8 or the scanning line 8' should be disposed approximately at the location of the trailing edge of the leading stopped container 3 which bears against the respective stopper device 17a, 17b or is even set back with respect thereto in the direction of travel 20 so that the container moves parallel approximately in the middle of the longitudinal region of the product conveyor belt 6, in which the corresponding products are disposed.

As preferably the container conveyor belt 7a, 7b moves at substantially the same speed as the product conveyor belt 6, the right-hand half in FIG. 1 shows a construction with a product and container conveyor belt of an integral nature.

The pickers 4a and 4b are usually provided with a bridge-like main support or frame structure which extends over at least the product conveyor belt 6 and on which a picker arm 5 is pivotably fixed.

In that respect the picker arm 5 generally comprises an upper arm portion 13a and 13b respectively which is fixed to the main support structure by way of a shoulder joint 15 pivotably about a substantially perpendicular axis.

A respective lower arm 12a and 12b respectively is also fixed to the free end of each of the upper arms 13a and 13b respectively, pivotably about a substantially perpendicular axis. The movement of the lower arms 12a and 12b is produced by way of a lower arm parallelogram assembly 14a and 14b of which the upper arm 13a and 13b represents a parallel strut.

Fixed to the free end of the lower arm 12a, 12b is a respective sucker as indicated at 16a and 16b respectively which, after being moved to a defined position in the horizontal plane under the control of the control system 11, is lowered onto an individual product 2 which is disposed at that location, then lifts that individual product and lowers it into the appropriate container 3 after rotation about a perpendicular axis, to provide the desired correct orientation of the individual product 2 in relation to the container 3 for receiving it.

So that the suckers 16a, 16b of the pickers 4a, 4b know the individual positions on the constantly moving product conveyor belt 6, to which the suckers have to move to pick up the appropriate individual products at that locations, a second line camera 10 operatively associated with the first picker 4a records each position at which there is an individual product 2 on the product conveyor belt 6 as well as the rotational position of the individual product, as the individual products 2 pass beneath the scanning line 10' of the camera 10, and the recorded information is stored in the control system 11 and subjected to further processing and computation having regard to the belt travel speed which in practice is not always constant.

Furthermore, the control system 11 also takes account of the individual product 2 which has already been removed from the product conveyor belt 6 so that the respective products which are still present and which still have to be transposed into the respective container can be transposed by the subsequent picker movements performed by the subsequent pickers 4b and so forth.

In a preferred embodiment the first line camera 8 records not only the number of individual products 2 which pass through the apparatus beneath it, but it also immediately records the orientation and position thereof, instead of that function being performed by the second camera 10. Thus only a single line camera is required.

A separate container conveyor belt 7 has the advantage that the speed of operation thereof can be regulated independently of that of the product conveyor belt 6.

Thus for example the container conveyor belt 7 can be moved at a faster speed than the product conveyor belt 6 so that in the region of the pickers 4a and 4b, the containers 3 overtake the individual products 2 associated therewith.

As long as the difference in speed is not excessively great so that the overtaking process is therefore not terminated before the containers and products have moved through the region of the single picker or the plurality of pickers required for complete filling of the respective container, the faster speed of the container conveyor belt 7 causes the completely filled containers to be carried away rapidly, which is a desirable aspect.

Separate container conveyor belts 7a and 7b can also be utilised to provide that, as shown in the left-hand part in FIG. 1, two mutually separate container conveyor belts 7a and 7b run on respective sides of the product conveyor belt 6 on which different containers 3 or containers to be filled with different products can be disposed.

Likewise the container conveyor belts 7a and 7b may also move at mutually different speeds so that the one container conveyor belt 7a is to be primarily filled while the second product conveyor belt 7b which runs at a slower speed can serve as a buffer means if there are not a sufficient number of empty containers on the first transport belt or, which is the case for example when dealing with different individual products 2 arriving on the same product conveyor belt 6, those individual products 2 are not present on the belt 6 in the correct quantitative relationship with each other.

A further option provides that the line camera 8 or the line cameras 8 and 10 scan not only the region of the product conveyor belt 6 but also the region of the container conveyor belt 7a and 7b, with the stopper devices 17a and 17b for the container conveyor belts 7a and 7b being only arranged, in the direction of travel, downstream of the scanning line 8' and 10' respectively of the corresponding camera 8, 10.

By virtue of that arrangement it is possible for example for different containers 3 which arrive in a randomly mixed array on the conveyor belts 7a and 7b, or the different orientation thereof, or the different partial filling thereof, to be detected, whereby the picker line apparatus can be used in a particularly flexible manner.

Figure 2:
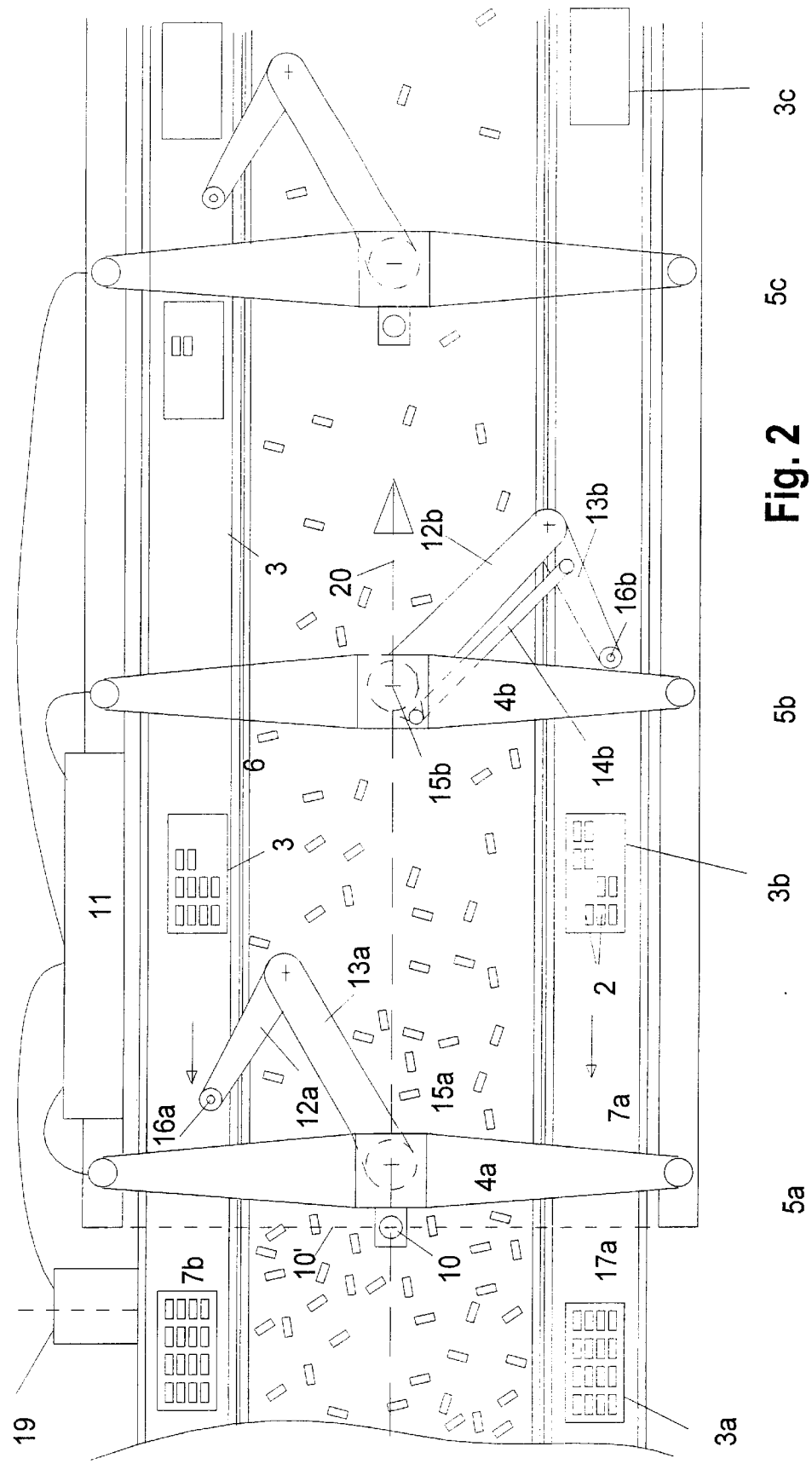
FIG. 2 is a plan view of a picker line operating in the counter-flow mode of operation.

Reference will now be made to FIG. 2 showing a picker line apparatus which operates in accordance with the principles of the present invention and in which, in contrast to the structure shown in FIG. 1, the product conveyor belt 6 and the container conveyor belts 7a and 7b move in the opposite directions relative to each other. In consideration of the close structural similarities between the apparatus shown in FIG. 1 and the apparatus shown in FIG. 2 and also the relatively close functional similarities thereof, reference numerals are used in FIG. 2 to denote components corresponding to those of the apparatus shown in FIG. 1. For the same reason the structure of the apparatus shown in FIG. 2 will not be described in full detail for the avoidance of repetition.

The FIG. 2 structure no longer has a line camera as indicated at 8 in FIG. 1 for counting the products, and generally it also does not have a stopper for producing an accumulation of containers 3 on the conveyor belt of which there are two container conveyors belts in FIG. 2, which are moved parallel and in the same direction, on respective sides of the central single product conveyor belt 6. The two container conveyor belts 7a and 7b however do not have to be driven at the same speed. A motor 19 is illustrated only in relation to the upper container conveyor belt 7a, the motor 19 also being connected to the control system 11 of the installation and the speed of rotation thereof and therewith the speed of transportation movement of the containers on that container conveyor belt being correspondingly regulated.

As an alternative to a central control system, the speed of the container conveyor belt 7, in relation to the product conveyor belt 6 which moves at a predetermined speed, can be controlled by the last picker 4a in the direction of travel 21 of the conveyor container belts 7a and 7b, or the separate control thereof.

As soon as the control of the picker 4a recognises that there is a danger that a container which has not been completely filled could leave the transposition region where products are transposed from the product conveyor belt 6 into a container 3, the control of the picker 4a causes a reduction in the speed of movement of the container conveyor belt 7. If the picker 4a which is the last picker in the direction of travel of the container conveyor belt 7 should fail, that function is then performed by the last operating picker 4b.

Even if the containers 3 are disposed at irregular spacings on a container conveyor belt, it is sufficient to control just the speed of movement of that container conveyor belt, and not necessarily also the relative spacing of the containers on the container conveyor belt.

For, if for the purposes of complete filling of the container just before leaving the transposition region, that is to say in the region of the operation performed by the picker 4a which is then the last picker in that direction of movement, the container conveyor belt for example 7b has to be temporarily reduced in speed, the only result of this is that the containers 3b and 3c which are disposed in the working region of the previous pickers 4b and 4c in the direction of travel of the container conveyor belt 7 are filled to a greater extent and are thus completely filled at an earlier point, within the transposition region.

The control 11 therefore controls the speed of the container conveyor belts 7a, 7b and generally also the working speed of the pickers 4a, 4b and 4c, the speed of the product conveyor belt 6 mostly being predetermined by production of the individual products delivered thereon, so that the containers, for example as indicated at 3a, which leave the transposition region, that is to say the gripping region of the picker 4a which is the last picker in the direction of movement of the container conveyor belt 7, can just precisely be completely filled. That provides that the efficiency of the installation is utilised in the optimum manner and, if the picker 4a, 4b operates at an adequate working speed, if only one kind of individual product 2 is delivered on the product conveyor belt 6, that arrangement can provide that, at the right-hand end in FIG. 2, that is to say on leaving the product conveyor belt 6 in the direction of movement 20 thereof and on passing out of the transposition region of the picker 4c which is the last picker in that direction of view, the product conveyor belt 6 no longer carries any individual products 2 as the density of the individual products 2 has been steadily and constantly reduced as they pass through the transposition region, that is to say the working regions of the respective pickers 4a, 4b and 4c. If nonetheless there should still be individual products present in the transposition region, they are possibly recirculated to a location upstream of the transposition region, onto the product conveyor belt 6, in order thus to pass through the apparatus once again.

This procedure can also be employed with only one single picker 4 so that the transposition region consists exclusively of the working region of that single picker.

The operating principle involved can also be employed in relation to a product conveyor belt 6 and a container conveyor belt 7 which operate at an angle relative to each other if the region in which the belts 6 and 7 cross is of sufficiently large area, although that crossed configuration means that it is necessary to accept the disadvantage that the individual transport units operate in different planes and cover each other over in the crossing region.

It will be appreciated that the above-described process and apparatus according to the invention have been set forth solely by way of example and illustration of the principles thereof and that various other modifications and alterations may be made therein without thereby departing from the spirit and scope of the invention.

What is claimed is:

1. A process for introducing individual products into containers, which comprises the following steps:
    a) providing a picker line apparatus which includes:
        a picker means which is pivotably supported for universally dimensional operation;
    b) moving the individual products and the containers with a transportation movement;
    c) sensing the location of the individual products and containers with the sensing means;
    d) pivoting the picker; and
    e) delivering the next container to be filled to a working region, whereby products can be transposed into the container by rotating the picker means about a perpendicular axis.

2. The process according to claim 1, wherein the transportation movement is counterflow.

3. The process according to claim 1 wherein the transportation movement is parallel.

4. The process according to claim 1 wherein the transportation movement is irregular.

5. The process according to claim 1 wherein the picker line apparatus further comprises:
    a plurality of successively arranged picker means arranged from first to last picker means.

6. The process according to claim 1 wherein delivering the individual products is performed by
    monitoring production of the individual products with the sensing means; and
    determining the delivery of the individual products with the control means according to at least one of the parameters of:
        a) a speed of transportation movement of the container; or
        b) a working speed of the picker means, wherein the working speed is controlled so that the container leaving the working region of the last picker means in the direction of transportation of the containers has just been entirely filled with the products.

7. The process according to claim 1 wherein delivering the individual products is performed by
    monitoring production of the individual products with the sensing means; and
    determining the delivery of the individual products with the control means according to at least one of the parameters of:
        a) a speed of transportation movement of the container; or
        b) a working speed of the picker means, wherein the working speed is controlled so that no products leave the working region of the last picker means in the direction of transportation movement of the products.

8. The process according to claim 5 wherein delivering the containers is performed by
    monitoring production of the containers with the sensing means; and determining the delivery of the containers according to at least one of the parameters of:
a) a speed of delivery of the individual products; or
b) a working speed of the picker means, wherein the working speed is controlled so that the container leaving the working region of the last picker means in the direction of transportation of the containers has just been entirely filled with the products.

9. The process according to claim 5 wherein delivering the containers is performed by monitoring production of the containers with the sensing means; and determining the delivery of the containers according to at least one of the parameters of:
a) a speed of delivery of the individual products; or
b) a working speed of the picker means, wherein the working speed is controlled so that no products leave the working region of the last picker means in the direction of transportation movement of the products.

10. The process according to claim 5 wherein moving the products is performed with predetermined speed, and moving the containers is performed at increasing speed, controlled in accordance with that a first container to be filled is not filled in succession by all successively operating picker means but only by the last picker means, while filling of the subsequent containers is performed by an increasing number of picker means.

11. The process according to claim 1 further comprising counting the individual products with the sensing means before the individual products reach the working region of the picker means.

12. The process according to claim 11 wherein delivering the next container to be filled into the working region of the picker means is enabled only when the number of individual products for filling a container has been detected in a sensing procedure.

13. The process according to claim 11 further comprising:
detecting a minimum number of individual products for delivery to the next container to be filled;
allowing a displacement in time such that the sensing means and an initial point of the delivery movement for the containers are aligned with individual products and containers to be filled; and
moving the container to be filled approximately parallel beside the individual products intended for that container.

14. The process according to claim 1 wherein the containers are accumulated as a group before reaching the working region of the picker means.

15. The process according to claim 1 wherein the individual products and containers are transported jointly.

16. A picker line apparatus for introducing individual products into containers, comprising:
a control means;
a sensing means, wherein the sensing means communicates with the control means;
a first surface for conveying products;
a second surface for conveying containers; and at least one picker means for transposing individual products into the containers, wherein the picker means is pivotably supported for universally dimensional operation, wherein the picker means, the first surface and the second surface are controlled by the control means.

17. The apparatus according to claim 16, wherein the picker means has a working region where the picker means can remove products from the first storage surface so that all the products in the working region can be removed.

18. The apparatus according to claim 16, wherein the first surface is a product conveyer belt, and the second surface is a container conveyer belt.

19. The apparatus according to claim 18, wherein the control means comprises a computer, the sensing means comprises at least one camera, wherein at least one camera can scan transversely over the conveyer belt, whereby the control means and the sensing means can function as a counter.

20. The apparatus according to claim 18 wherein the product conveyer belt and the container conveyer belt are substantially parallel, so that the container conveyer belt can run at a speed sufficient so that a number of products required to fill the container enters the working region of the picker means during a time period in which the container traverses the working region.

21. The apparatus according to claim 18 wherein the product conveyer belt and the container conveyer belt are substantially parallel, so that the container conveyer belt can run at a speed sufficient to allow a number of products required to fill the container to leave the working region of the picker means during a time period which the container traverses the working region.

22. The apparatus according to claim 18 further comprising:
at least one means for registering the position of all individual products on the product conveyer belt, wherein the means for registering the position of all individual products on the product conveyer belt is located at the picker means, wherein the control means can control the picker means by taking account of the speed of the product conveyer belt and positions of the picker means.

23. The apparatus according to claim 22 wherein the means for registering the position of all individual products on the product conveyer belt comprises a second line camera, wherein the second line camera is capable of scanning transversely over the product conveyer belt.

24. A picker line apparatus for introducing individual products into containers, comprising:
a control means;
a sensing means, wherein the sensing means communicates with the control means;
a first conveyor belt for conveying products;
a second conveyor belt for conveying containers;
at least one picker means for transposing individual products into the containers, wherein the picker means is pivotably supported, wherein the picker means is operable to transfer products on the first conveyor belt into containers on the second conveyor belt, wherein the picker means and the conveyor belts are controlled by the control means; and
a drive means for producing relative movement of the conveyor belts and the picker means, wherein the first conveyor and the second conveyor move in a relationship, whereby the control means controls the speed of the first and second conveyor belts relative to each other such that the containers are entirely filled when the containers leave the working region of the last picker means in the direction of movement of the second conveyor.

25. The apparatus according to claim 24 wherein the picker means comprises:
a frame structure which extends over the first conveyor belt; and a picker arm pivotably fixed to the frame structure, wherein the picker arm comprises:
an upper arm;
a shoulder joint, wherein the shoulder joint attaches the upper arm to the frame structure so that the upper arm can pivot about a substantially perpendicular axis;
a lower arm, wherein the lower arm is fixed to the upper arm so that the lower arm can pivot about a substantially perpendicular axis;
a strut parallel to the upper arm, wherein the upper arm and the strut form a parallelogram assembly capable of producing movement of the lower arm; and
a rotatable sucker fixed to the lower arm, wherein the sucker can be lowered onto the individual product, lift the individual product, and rotate the individual product to provide a desired orientation of the individual product with the container.

* * * * *